Patented June 10, 1952

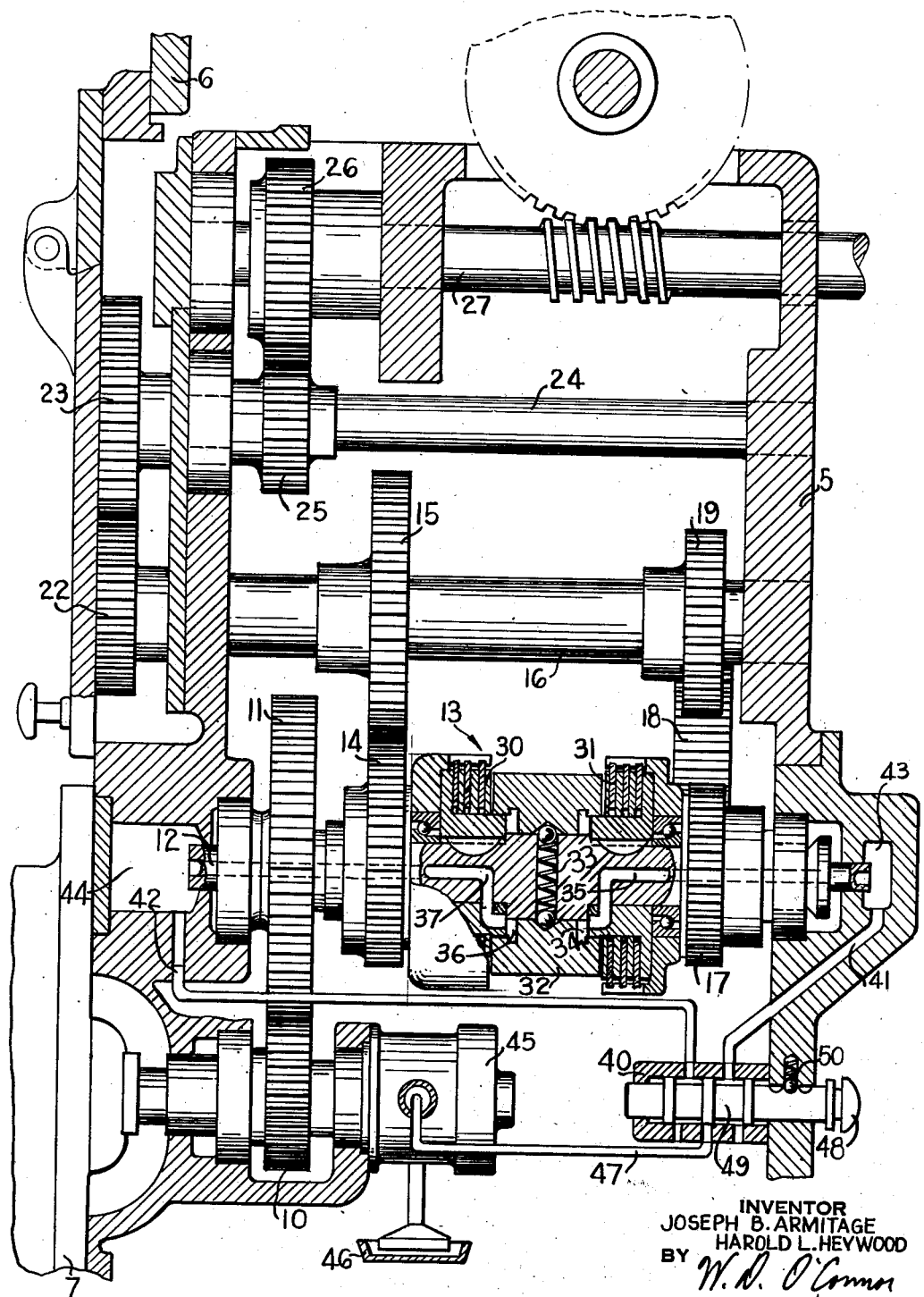

2,600,043

UNITED STATES PATENT OFFICE 2,600,043

HYDRAULIC CLUTCH MECHANISM

Joseph B. Armitage, Wauwatosa, and Harold L. Heywood, West Allis, Wis.

Application December 8, 1945, Serial No. 633,658

7 Claims. (Cl. 192—87)

This invention relates generally to machine tool transmission mechanism and more particularly to an improved hydraulically controlled clutch mechanism.

This specification constitutes a continuation-in-part of application Serial No. 373,274, filed January 6, 1941, that issued January 15, 1946, as Patent No. 2,392,963 and, which, in turn, was a continuation-in-part of application Serial No. 115,650, filed December 14, 1936, that issued January 7, 1941, as Patent No. 2,227,620.

A general object of the invention is to provide an improved machine tool clutch mechanism.

Another object of the invention is to provide an improved hydraulically operated clutch.

Another object of the invention is to provide an improved hydraulically controlled clutch to effect a reversal in a transmission driving train.

Still another object of the invention is to provide an improved hydraulically actuated reversing clutch for a milling machine transmission mechanism.

According to this invention, an improved machine tool transmission mechanism is provided with hydraulic controls to selectively actuate a reversing clutch. The reversing clutch is connected in the driving train of the machine tool transmission and serves to provide hydraulically actuated means for selectively engaging the clutch mechanism to effect power drive in either direction. To this end, a pair of friction clutches are arranged to be engaged alternatively to operate the driven members of the transmission in the desired direction by means of a hydraulically actuated device disposed between the clutches. A direct acting piston in the device is resiliently urged to a central position. The controlled admission of fluid against the one or the other end of the direct acting piston effects movement in direction to engage one clutch and effect a power drive through that clutch in the desired direction. The clutches are self adjustable and, consequently, automatically compensate for clutch plate wear.

The foregoing and other objects of this invention, which will become more fully apparent from the following detailed description, may be achieved by the particular structure shown in and described in connection with the accompanying drawing, in which the single figure is an expanded detailed view of a portion of a machine tool transmission mechanism including a longitudinal sectional view of a hydraulically actuated reversing mechanism embodying the present invention.

Referring more specifically to the drawing, the machine tool transmission mechanism illustrated is particularly adapted to effect feed rate changes and reversals in the power drive to milling machine cutter heads of the type fully described in the aforementioned Patent No. 2,227,620. The transmission is preferably mounted in a frame 5, which is bolted into a machine bed 6. Power for actuating the transmission is derived from a driving motor 7 bolted on the side of the frame 5.

The motor 7 is connected to a driving pinion 10 that meshes with a gear 11 keyed on a driving element or clutch shaft 12. The clutch shaft 12 carries a reversing mechanism 13, including a gear 14 mounted on an anti-friction bearing and that meshes with a driven gear element 15 on a driven member or shaft 16 to constitute a forward feed driving train. The shaft 12 also carries a rotatably mounted gear 17 meshing with an idler pinion 18 that, in turn, meshes with a driven gear element 19 on the shaft 16 to constitute a reverse driving train for driving the shaft 16 in the opposite direction.

The feed change gearing consists of a pick-off gear 22 removably mounted on the end of the shaft 16 and a complementary pick-off gear 23 similarly mounted on the end of a jack shaft 24. The pick-off gears 22 and 23 may be of any selected ratio to transmit power at the desired rate from the shaft 16 to the shaft 24. A pinion 25 on the shaft 24 engages a gear 26 on a main driven shaft 27, which is connected to drive the machine cutter heads in a manner fully described in the aforementioned patent.

To provide for selecting the direction in which the main driven shaft 27 is driven, the gears 14 and 17, rotatably mounted on the clutch shaft 12, are arranged to be selectively connected to the shaft 12 by friction clutches 30 and 31, respectively. The friction clutches 30 and 31 are arranged to be engaged alternatively to drive the main driven shaft 27 in a clockwise or counter-clockwise direction, by means of a fluid pressure actuated device in the form of a hydraulic piston mechanism including a piston element 32 that is slidably mounted on the shaft 12 between the clutches and arranged to be normally urged to a central position therebetween by means of a spring-actuated detent or centering mechanism 33.

To engage the forwardly driving friction clutch 30 for driving the mechanism in a forward feed direction, fluid pressure is admitted to a chamber 34 at the right end of the piston 32, through a passageway 35 that extends longitudinally through the center of the shaft 12 to the right end thereof, the fluid pressure serving to move the piston 32 to the left to force the plates of the clutch 30 into engagement. To engage the reversibly driving friction clutch 31 for driving the mechanism in a reverse direction, fluid pressure is admitted to a chamber 36 at the left end of the piston 32, through a passageway 37 extending longitudinally through the center of the shaft 12 to the left end thereof.

By reason of the fact that the piston 32 acts directly on the plates of the clutches 30 and 31 under the influence of the fluid pressure, the apparatus is self-adjusting to compensate for any wear to which the clutch plates may be subjected.

When pressure is relieved from both the chamber 34 and the chamber 36, the reaction of the engaged clutch and the pressure of the detent spring forces the detent mechanism 33 into central spherical detent notches in the piston 32 to return the piston to the center position and disengage both of the clutches.

The flow of hydraulic fluid into the passageways 35 and 37 is controlled through the operation of a control valve 40, which directs the fluid flow through the one or the other of a pair of conduits 41 and 42 leading to the outer ends of the respective passageways. Thus, when the clutch 30 is to be engaged, the hydraulic fluid is caused to flow from the conduit 41 into a well 43 formed in the machine frame 5 at the right end of the clutch shaft 12 and thence into the passageway 35 and the chamber 34 to effect leftward piston movement. When fluid is directed into the conduit 42, it will flow into a well 44 formed in the transmission frame 5 adjacent to the left end of the clutch shaft 12. From the well 44, the fluid will flow through the passageway 37 and into the chamber 36 to force the piston rightwardly and effect engagement of the clutch 31, as previously described.

Fluid pressure for the hydraulic system is supplied by a gear pump 45, which is mechanically connected to and driven from the armature shaft of the motor 7. Thus, a supply of hydraulic fluid is available whenever the motor 7 is running. The pump 45 pumps the fluid from a sump 46 to the control valve 40 via a feed line 47. The manipulation of a control knob 48 serves to position a piston 49, slidably disposed in the body of the valve 40, in one of three positions, namely: a lefthand position wherein fluid from the line 47 is directed into the conduit 41, a righthand position wherein fluid is directed into the conduit 42, and a middle or neutral position, as shown, wherein the line 47 is blocked and both of the conduits 41 and 42 are open to exhaust. A detent mechanism 50 serves to retain the piston 49 selectively in any one of the three positions. Thus, the flow of hydraulic fluid is readily controlled to actuate the piston 32 for engaging either of the friction clutches 30 and 31 selectively, as previously described.

Although a specific form of the invention has been described in detail, in order to clearly disclose the several features of the invention, it is to be understood that the particular structure shown and described is susceptible of various modifications that will be apparent to those skilled in the art without departing from the spirit and scope of the invention, as defined in the subjoined claims.

The principles of the invention having now been fully explained in connection with the foregoing description of an illustrative preferred embodying structure, we hereby claim as our invention or discovery:

1. In a machine tool driving mechanism, the combination with a driving shaft and two driven elements, of two friction clutches carried by said shaft in spaced relation and operatively arranged to selectively connect said shaft to said two driven elements respectively, a hydraulic piston mechanism disposed concentrically with said shaft between said clutches, the piston of said mechanism being slidably mounted on said shaft and operatively connected to engage either the one or the other of said clutches alternatively upon moving in the one or the other direction respectively, means for admitting pressure fluid to the one or the other side of said piston, and means operative to urge said piston to a central neutral position, whereby both clutches will be disengaged when no pressure fluid is applied to said piston.

2. A hydraulic control means for clutches in a transmission comprising a source of hydraulic power, a driving shaft, a driven shaft, a pair of clutches operably connected between said shafts, said clutches including driving clutch members operably connected to said driving shaft and driven clutch members operably connected to said driven shaft to provide an alternative driving connection between said shafts, a piston concentrically and slidably mounted on said driving shaft between said clutches, a resilient centering means arranged to urge said piston to a neutral position, and hydraulic conductors in said driving shaft to permit the selective application of said hydraulic power to said piston, whereby said piston is moved to engage said clutches selectively by hydraulic power and is returned to neutral position by said resilient centering means.

3. A hydraulically controlled reversing clutch mechanism comprising a driving shaft, a forwardly driving friction clutch mounted on said shaft, a reversedly driving friction clutch mounted on said shaft, a hydraulic piston slidably mounted on said driving shaft intermediate said clutches, a detent mechanism on said shaft arranged to centrally position said piston, and selectively operable control means to direct fluid to effect piston movement and selectively actuate one of said clutches.

4. In a clutch mechanism of the class wherein two friction clutches are disposed in spaced relationship on a driving shaft with a piston carried on said shaft and arranged to selectively engage the one or the other of said clutches upon fluid pressure being applied to the one or the other side of said piston, the combination with said piston of spring-actuated means arranged to continuously urge said piston to a central neutral position, whereby said friction clutches are positively disengaged upon the relief of said fluid pressure.

5. In a hydraulically controlled clutch mechanism having a driving shaft, a forwardly driving friction clutch mounted on said shaft, a reversedly driving friction clutch mounted on said shaft, a fluid pressure actuator for said clutches comprising a hydraulic piston slidably mounted on said driving shaft intermediate said clutches, selectively operable control means to effect piston movement by fluid pressure for selective actuation of one or the other of said clutches, and a spring-actuated detent mechanism arranged to urge said piston to a central neutral position, whereby both clutches will be disengaged when fluid pressure is relieved from said piston.

6. A hydraulic control means for clutches in a transmission, comprising a source of hydraulic power, a driving shaft, a friction clutch operably mounted on said shaft, a clutch actuating piston concentrically and slidably mounted on said driving shaft adjacent to said clutch, a passageway within said shaft connected to permit the selective application of said hydraulic power to said piston, an annular tapered notch on the inner periphery of said piston, and a spring-actuated detent within said shaft and cooperable with said notch, the arrangement being such that said piston is positively urged by said detent to neutral position upon the release of hydraulic pressure.

7. In a machine tool transmission mechanism, a driving shaft having independent passageways extending inwardly from each end thereof, a driven shaft, a forwardly driving clutch including a driving member fixedly mounted on said driving shaft and a driven member rotatably mounted on said driving shaft and gear connected to said driven shaft, a rearwardly driving clutch including a driving member fixedly mounted on said driving shaft and a driven member rotatably mounted on said driving shaft and gear connected to said driven shaft, a piston mechanism including a piston slidably mounted on said driving shaft intermediate said passageways and said clutches in such manner that said piston may be moved in either direction to actuate either of said clutches by selectively admitting fluid under pressure through said passageways, and a centering mechanism disposed to urge said piston to a neutral position and effect disengagement of said clutches whereby said driven clutch members may be selectively engaged to drive said driven shaft upon movement of said piston from said neutral position.

JOSEPH B. ARMITAGE.
HAROLD L. HEYWOOD.

REFERENCES CITED

The following references are of record in the file of this patent:

UNITED STATES PATENTS

| Number | Name | Date |
| --- | --- | --- |
| 226,302 | Galloway et al. | Apr. 6, 1880 |
| 555,036 | Church | Feb. 18, 1896 |
| 857,393 | Hagman | June 18, 1907 |
| 1,748,827 | Boltshauser | Feb. 25, 1930 |
| 1,783,513 | Maurer | Dec. 2, 1930 |
| 2,156,033 | Sloan | Apr. 25, 1939 |
| 2,227,620 | Armitage et al. | Jan. 7, 1941 |
| 2,392,963 | Armitage et al. | Jan. 15, 1946 |